UNITED STATES PATENT OFFICE.

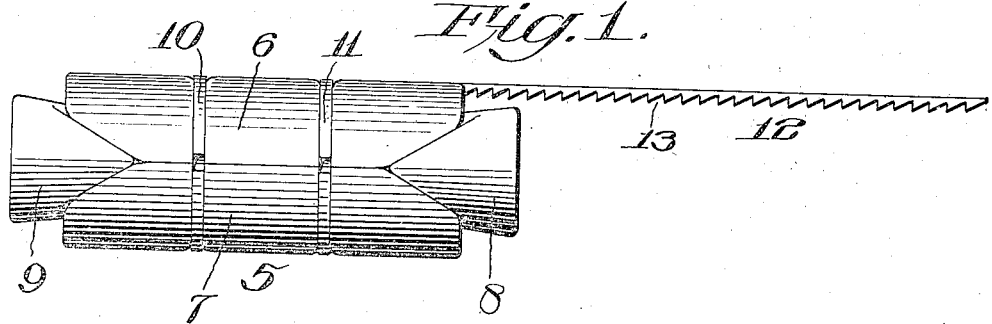
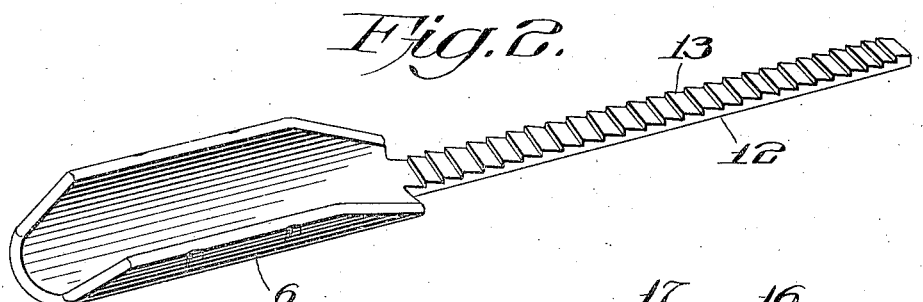
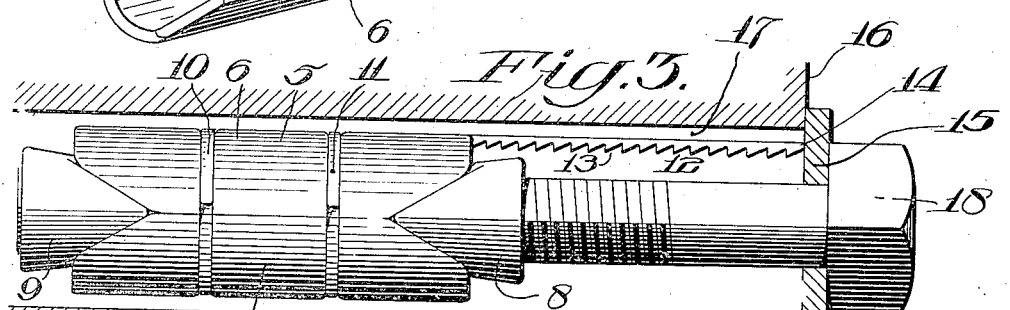
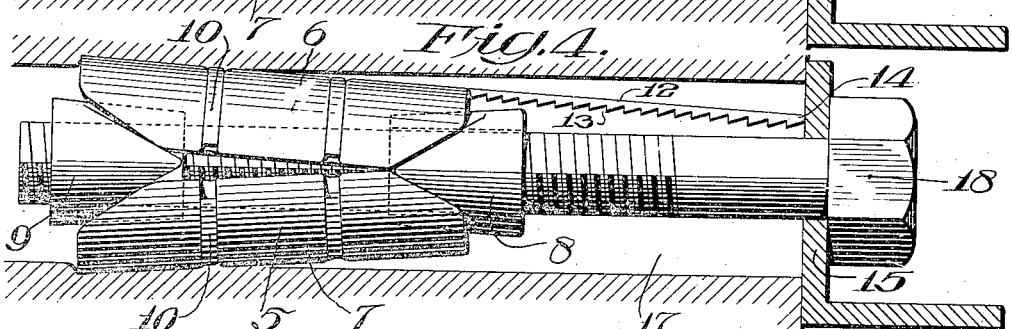

GILBERT E. OSGOOD, OF PHILADELPHIA, PENNSYLVANIA, ASSIGNOR OF ONE-HALF TO VIOLA J. GOSNELL, OF PHILADELPHIA, PENNSYLVANIA.

EXPANSION-BOLT.

1,359,833.　　　　Specification of Letters Patent.　　Patented Nov. 23, 1920.

Application filed August 2, 1919. Serial No. 314,836.

*To all whom it may concern:*

Be it known that I, GILBERT E. OSGOOD, a citizen of the United States, residing at Philadelphia, in the county of Philadelphia and State of Pennsylvania, have invented certain new and useful Improvements in Expansion-Bolts, of which the following is a specification.

Expansion bolts are often used for the purpose of anchoring or securing articles to stone walls or the like and, when so used, the expansion bolts are expanded within holes in the walls by the turning of headed screws which are usually a part of the expansion bolts.

Prior to my present invention it was practically impossible after inserting the expansion bolt in the hole of a wall to prevent the bolt from moving outward in the direction of the length of the hole prior to the time in which the bolt expanded into engagement with the sides of the hole. For this latter reason it could never be positively determined just where the bolt would be located in the hole after it had been expanded.

One object of my present invention is to provide means on expansion bolts which will prevent the above mentioned outward movement of the expansion bolt in the direction of the length of the hole and thereby hold the bolt in the desired position within the depth of the hole during the expansion of the bolt.

Another object is to so make my invention that it can be formed as an integral part of practically all types of expansion bolts and will be of a simple construction.

These objects, and other advantageous ends which will be described hereinafter, I attain in the following manner, reference being had to the accompanying drawing in which Figure 1 is a front elevation showing my invention as forming a part of a well known type of expansion bolt, Fig. 2 is a perspective view of the part of the expansion bolt shown in Fig. 1 having my invention thereon, Fig. 3 is an elevation showing how my invention is adapted to position an expansion bolt within a hole in a wall prior to the expanding action; the wall being shown in section, and Fig. 4 is a view of similar nature to Fig. 3 showing the bolt expanded into engagement with the sides of the hole; the expansible portions of the bolt occupying the same distance from the outer end of the hole as the distance occupied by said parts in Fig. 3 prior to expanding.

Referring to the drawing, 5 represents an expansion bolt having two expansible portions 6 and 7. A tapered sleeve 8 and a tapered nut 9 are positioned between the portions 6 and 7 at the ends thereof; said portions being normally held together by split rings 10 and 11. My invention consists in providing the portion 6 with a tongue 12; said tongue being preferably cast integral with said portion 6 and extending forwardly in the direction of its length in a manner illustrated in Fig. 1. This tongue 12 is notched throughout its length as shown at 13 so that the tongue can be easily fractured or broken off at any desired distance from the portion 6 according to the distance in which it is desired to lock the expansion bolt within a hole in a wall or the like. For example, the expansion bolts can be manufactured and sold with extremely long tongues and the workman when using the expansion bolts can break the tongue 12 so as to permit the desired length of tongue to remain on the bolt in order to space the bolt inwardly from the outer end of the hole. In the use of my invention, the outer end 14 of the tongue 12 can abut any article, such for example as the angle 15, which is to be secured to the wall 16. The expansion bolt can be placed within the hole 17 after the headed screw 18 is inserted through the angle 15 or other article and engages the nut 9 after having passed through the sleeve 8 and portions 6 and 7 as clearly shown in Fig. 3. By turning the screw 18 any tendency from the expansion bolt 5 to move toward the angle 15 will be prevented by the engagement of the end 14 of the tongue 12 with the angle 15. The turning action of the screw 18 is therefore immediately directed to the expansion of the portions 6 and 7 so that after first positioning the expansion bolt and cutting the tongue at the proper length, the expansion bolt will be compelled to expand in the desired position in which it is initially spaced from the outer end of the hole 17. This is clearly illustrated in Fig. 4.

It will thus be noted that the tongue 12 is a spacer which spaces the bolt the proper distance inwardly from the outer end of the hole 17.

By making the tongue 12 integral with a part of the expansion bolt proper it can be readily transported and is a great convenience since it forms a part of the bolt and is always present when needed. Furthermore, by notching the tongue 12 it is a very easy matter to break the tongue at different positions within its length since a mere tap of the tongue by a hammer will suffice to provide a clean break of the tongue transversely. For example, Figs. 3 and 4 show the tongue having been broken from the length illustrated in Fig. 1.

In the form of expansion bolt illustrated it will be noted that the sleeve 8 has no operative function and as illustrated merely serves to normally keep the parts 6 and 7 in parallel relation to permit the insertion of the expansion bolt into the hole in the wall.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

An expansion bolt having a spacing tongue projecting therefrom, said spacing tongue having transversely extending notches formed within its length, said notches being located at relatively short distances apart; substantially as described.

In testimony whereof I have signed my name to this specification in the presence of two subscribing witnesses.

GILBERT E. OSGOOD.

Witnesses:
ANNA RENTON,
CHAS. E. POTTS.